(12) United States Patent
Kobel et al.

(10) Patent No.: US 11,746,500 B2
(45) Date of Patent: Sep. 5, 2023

(54) COORDINATED MOTION SYSTEM AND METHOD

(71) Applicant: Oshkosh Corporation, Oshkosh, WI (US)

(72) Inventors: Korry Kobel, Oshkosh, WI (US); Fredric Yutzy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/970,844

(22) Filed: Oct. 21, 2022

(65) Prior Publication Data

US 2023/0131482 A1    Apr. 27, 2023

Related U.S. Application Data

(60) Provisional application No. 63/270,776, filed on Oct. 22, 2021.

(51) Int. Cl.
*E02F 9/20* (2006.01)
*E02F 9/26* (2006.01)

(52) U.S. Cl.
CPC ............. *E02F 9/205* (2013.01); *E02F 9/265* (2013.01)

(58) Field of Classification Search
CPC .................................. E02F 9/205; E02F 9/265
See application file for complete search history.

(56) References Cited

U.S. PATENT DOCUMENTS

| 8,285,432 B2* | 10/2012 | Heap | B60K 6/365 |
| | | | 180/65.21 |
| 2018/0074520 A1 | 3/2018 | Liu et al. | |
| 2018/0120862 A1 | 5/2018 | Dembinski et al. | |
| 2020/0095105 A1 | 3/2020 | Yutzy et al. | |
| 2021/0060366 A1 | 3/2021 | Minnick et al. | |
| 2021/0213956 A1* | 7/2021 | Schön | B60W 40/08 |
| 2021/0228176 A1* | 7/2021 | Vandroux | A61B 6/4441 |
| 2021/0279914 A1 | 9/2021 | Shoup et al. | |
| 2022/0194769 A1 | 6/2022 | Kobel et al. | |
| 2022/0198905 A1 | 6/2022 | Brulo et al. | |

(Continued)

OTHER PUBLICATIONS

International Search Report and Written Opinion regarding International Application No. PCT/US2022/047367 dated Feb. 21, 2023, 15 pps.

*Primary Examiner* — Russell Frejd
(74) *Attorney, Agent, or Firm* — Foley & Lardner LLP

(57) ABSTRACT

A vehicle system includes a first work machine including a first actuator and a first control system, a second work machine including a second actuator and a second control system, and a user input system including a transceiver and a user interface. The user input system is configured to receive a user input via the user interface and provide a signal to both the first control system and the second control system. The first control system and the second control system are configured to receive the signal and thereafter operate the first actuator of the first work machine and the second actuator of the second machine in a coordinated mode of operation. The user input system is configured to provide, and the first control system and the second control system are configured to receive, the signal simultaneously thereby reducing latency between motion of the first work machine and the second work machine in the coordinated mode of operation.

14 Claims, 14 Drawing Sheets

(56) References Cited

U.S. PATENT DOCUMENTS

| | | |
|---|---|---|
| 2022/0227612 A1 | 7/2022 | Kobel et al. |
| 2022/0227613 A1 | 7/2022 | Boroni et al. |
| 2022/0227614 A1 | 7/2022 | Yutzy et al. |
| 2022/0229415 A1 | 7/2022 | Kobel et al. |
| 2022/0229431 A1 | 7/2022 | Kobel et al. |
| 2022/0229523 A1 | 7/2022 | Kobel et al. |
| 2022/0229872 A1 | 7/2022 | Kobel et al. |
| 2022/0230224 A1 | 7/2022 | Kobel et al. |
| 2022/0230488 A1 | 7/2022 | Kobel et al. |
| 2022/0230523 A1 | 7/2022 | Kobel et al. |
| 2022/0232352 A1 | 7/2022 | Kobel et al. |
| 2022/0232649 A1 | 7/2022 | Kobel et al. |
| 2022/0332556 A1 | 10/2022 | Kobel et al. |

* cited by examiner

ODINATED MOTION SYSTEM AND
METHOD

CROSS-REFERENCE TO RELATED PATENT
APPLICATION

This application claims the benefit of and priority to U.S. Provisional Patent Application No. 63/270,776, filed on Oct. 22, 2021, which is incorporated herein by reference in its entirety.

BACKGROUND

The present disclosure relates generally to work equipment. More specifically, the present disclosure relates to a control system for controlling multiple work machines.

Work equipment such as lifts and telehandlers often require tracking, tasking, monitoring, and servicing at a work site. Managers and operators of working machines typically rely on discrete systems, applications, and methods to perform these functions for each piece of equipment.

SUMMARY

One exemplary implementation of the present disclosure relates to a vehicle system. The vehicle system includes a first work machine including a first actuator and a first control system, a second work machine including a second actuator and a second control system, and a user input system including a transceiver and a user interface. The user input system defines at least one of a portion of the first control system of the first work machine, a portion of the second control system of the second work machine or a third control system. The user input system is configured to receive a user input via the user interface and provide a signal to both the first control system and the second control system. The first control system and the second control system are configured to receive the signal and thereafter operate the first actuator of the first work machine and the second actuator of the second machine in a coordinated mode of operation. The user input system is configured to provide, and the first control system and the second control system are configured to receive, the signal simultaneously thereby reducing latency between motion of the first work machine and the second work machine in the coordinated mode of operation.

Another exemplary implementation of the present disclosure relates to a system. The system includes a first non-transitory computer-readable medium having instructions stored thereon that, when executed by one or more first processors, cause the one or more first processors to implement operations including controlling a first motor to drive a first actuator, and sending a first signal from a first sensor of a first controller. The system further includes a second non-transitory computer-readable medium having instructions stored thereon that, when executed by one or more second processors, cause the one or more second processors to implement operations including controlling a second motor to drive a second actuator, and sending a second signal from a second sensor of a second controller. The system further includes a third non-transitory computer-readable medium having instructions stored thereon that, when executed by one or more third processors, cause the one or more third processors to implement operations including receiving the first signal from the first controller and the second signal from the second controller, comparing the first signal and the second signal to a signal threshold to develop a third signal, and sending a command via a third controller to the first controller and the second controller to move the first actuator and the second actuator indicative of the third signal.

Another exemplary implementation of the present disclosure relates to a vehicle system. The vehicle system includes a first vehicle and a control system. The first vehicle includes a first position sensor configured to detect a first position data of the first vehicle, and a first controller configured to receive the first position data from the position sensor. The control system is configured to receive an input from an operator. The control system includes a processor configured to process the input and send a command to the first vehicle to modify a position of the first vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a first lift device and a second lift device are shown. The first lift device includes a first communication module and the second lift device includes a second communication module. The lift devices are configured to provide coordinated control via the communication modules. By way of example, the first lift device may be controlled by an operator, and the second lift device may coordinate (e.g., mirror, follow, mimic, augment, supplement, etc.) motion with the first lift device.

In one embodiment, the first communication module interfaces directly with the second communication module. In other embodiments, the first communication module interfaces with the second communication module via a remote device (e.g., a cellular network). A control system of the first lift device may receive a user input (e.g., from a user input device, etc.) and then provide the user input to the first communication module. The second communication module may receive the user input from the first communication module and therafter provide the user input to a control system of the second lift device. The control system of the second lift device may therafter actuate components of the second lift device to coordinate motion thereof with the first lift device. The control system of the first lift device may delay seconding signals to the components of the first lift device, thereby reducing the risk of the first lift device moving before the second lift device has received, interpreted, and acted on the user input.

In other embodiments, a user input device of the first lift device is configured to provide the user input directly to the first communication module and the second communication module, where each communication module thereafter provides the user input to the control systems of the lift devices for use in actuating the lift devices.

Figure 1:
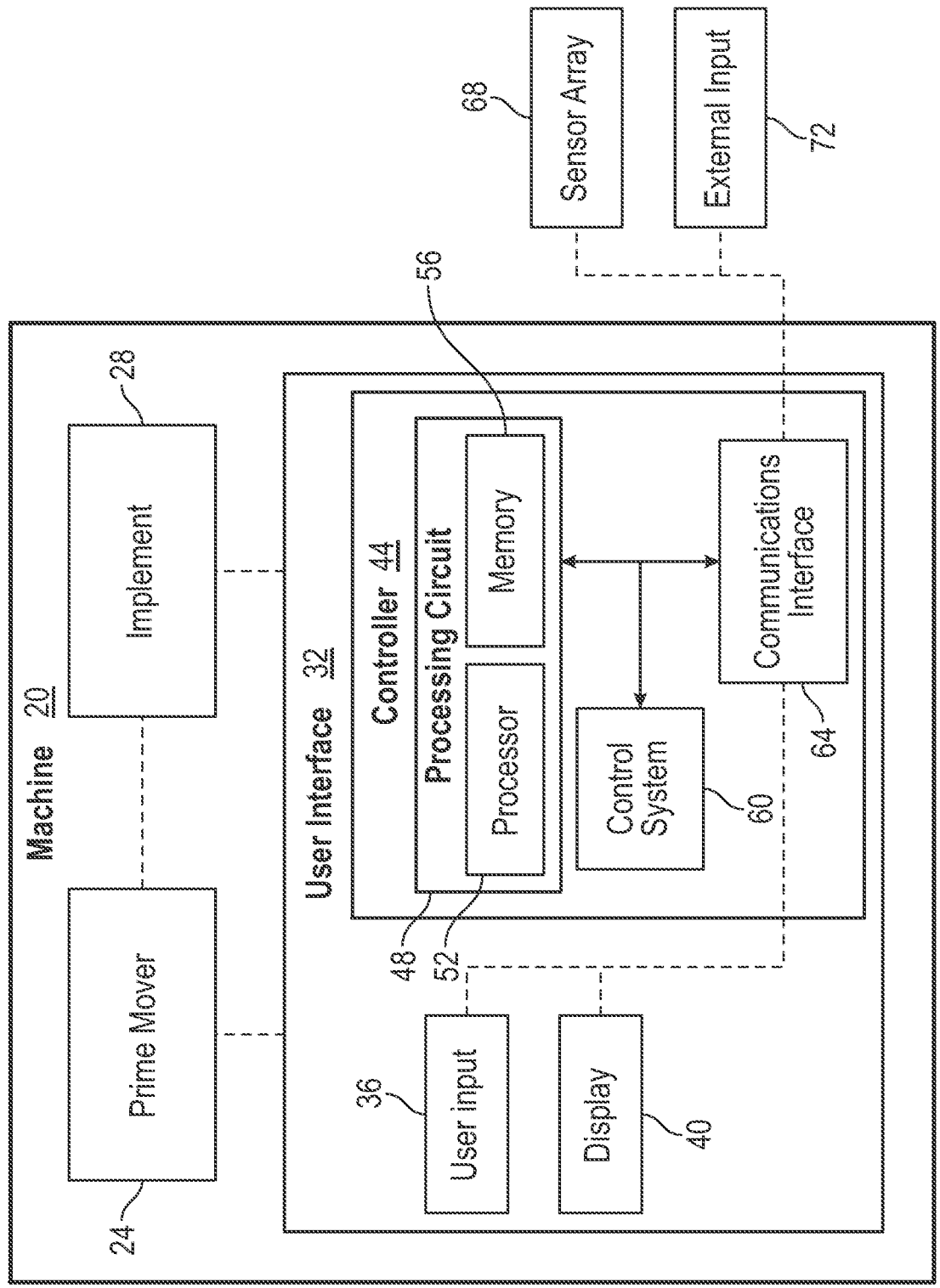
FIG. 1 is a schematic representation of a work machine including a machine control module according to an exemplary embodiment.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a boom lift, a scissor lift, a telehandler arm, etc.

A user interface 32 is arranged in communication with the prime mover 24 and the implement 28 to control operations of the work machine 20. The user interface 32 includes a user input 36, a display 40, and a control module 44. The user input 36 is received via a machine operator to interact with at least one of the user interface 32. The display 40 is configured to communication to the machine operator (e.g., a display screen, a lamp or light, an audio device, a dial, or another display or output device).

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to at least one of a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the work machine 20 relative to locations, maps, other equipment, objects or other reference points. In an exemplary embodiment, the sensor array 68 includes sensors configured to measure positions of the equipment relative to other portions of the equipment or reference points which are stored and processed by processing circuit 48. In some embodiments, the sensor values are recorded at time intervals (e.g., 1 second, 1 microsecond, etc.). In some embodiments, the most recent or current sensor value may be compared to one or more prior sensor values stored in memory device 56 to detect changes in position, orientation, location, status, or other criteria. In an exemplary embodiment, the recorded sensor data is processed using a set of instructions (e.g., instructions stored in memory device 56) to process the stored sensor values into a meaningful equivalent for viewing by a user (e.g., operator, manager, dealer, etc.). For example, electronic sensors (e.g., transducers) may output sensed information in the form of an electronic signal (e.g., voltage, current, analog signal, digital signal, etc.) which may be processed by the processing circuit 48, or by circuitry the sensor itself, to yield meaningful equivalents (e.g., position of a terminal end of the implement, an implement angle or position relative to another portion of the work equipment, temperature of a fluid, on/off status, etc.). The meaningful equivalents and/or the electronic signals may be viewable or accessible by the user through one or more displays 40.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates work machines 20 connected on a near network to one or more other work machines 20. In some embodiments, the automatic associations are based on rules stored on a work machine or on another network node. In some embodiments, the association rules are based on one or more of a work site designation, a location of a machine, or a code (e.g. a customer key, a manufacturer key, or a maintainer key).

The work machine 202 is communicably connected 204 to a control module 206. Connectivity 204 between the work machine 202 and the control module 206 may be wired or wireless thus providing the flexibility to integrate the control module with the work machine 202 or temporarily attach control module 206 to the work machine 202. The control module 206 may be configured or may be reconfigurable in both hardware and software to interface with a variety of work machines 202, 212, 214. The control module 206 may comprise an integral power source or may draw power from the work machine 202 or another external source of power. Control modules 206 may be installed on or connected to products (e.g., third party products) 212, 214 not configured by the original product manufacturer with a control module 206.

The control module 206 establishes one or more communication channels 208, 210 with a connectivity module 218. The connectivity module 218 provides a plurality of links between one or more work machines 202, 212, 214 and a coordinated control system 200. The coordinated control system 200 may be operably coupled to one or more work machines, where the one or more work machines receive a control command at substantially the same moment. The coordinated control system 200 are further described herein. The connectivity module 218 may be on-board a work machine 202 or may be located at a worksite (e.g., at a stationary position near a central location of a worksite). In some embodiments the connectivity module is a portion of the control module 206. Applications providing functions for the coordinated control system 200 may be run by the control modules 206 on one or more work machines 202. The control modules 206 may exchange commands, codes (e.g. a customer key) and data between work machines 202, 212, 214, and user devices 272. Connections between machines and user devices may be provided by a wireless mesh network, for example.

The connectivity module 218 comprises hardware 220, further comprising at least one of antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth®, Bluetooth® low energy, WiFi, cellular, optical, and satellite communications. The connectivity module 218 may function as a gateway device connecting work machine 202 to other work machines 212, 214, remote networks 244, 272, 276, and 280, and other networks.

The coordinated control system 200 may be configured to monitor and control the coordination of multiple work machines 202, 212, 214 within the same work site. In some embodiments, the coordinated control system 200 reports position, status, controls, etc. for a single work machine 202 within a work site. For example, a work machine 202 equipped with a coordinated control system 200 may remotely report the results of coordinated position controls between multiple work machines 202, 212, 214 at a desired interval.

The coordinated control system 200 provides connectivity between work machines 202, 212, 214 and at least one of remotely hosted user interfaces 272, network portals 276, application interfaces/application programming interfaces 280, data storage systems 256, cloud and web services 268, and product development tool and application hubs 244. The product development tool and application hubs 244 may function as an Internet of Things (IoT) system for operation, control, and support of work machines 202, 212, 214 and users of work machines. Connections 232, 234, 238, 242, 252, 254, 270, 274, and 278 between nodes connected to the coordinated control system 200 may comprise, for example, cellular networks, or other existing or new means of digital connectivity.

Product development tool and application hubs 244 may comprise at least one of tools and applications for internal visualizations 246, customer subscription management 248, device provisioning 250, external systems connectors 262, device configuration management 264, user/group permissions 260, asset allocation 262, fleet management, compliance, etc. In some embodiments, systems 244 may receive or determine control information from the sensors on-board work machine 202, or may receive a control history from the control module 206.

Figure 3:
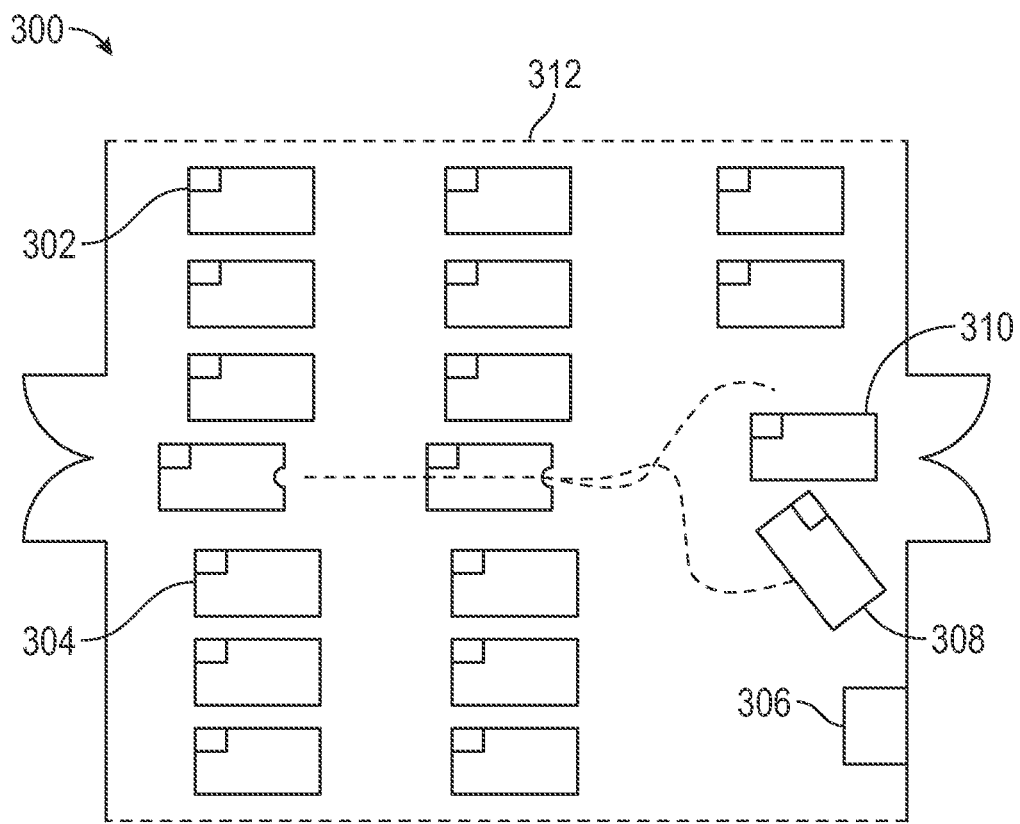
FIG. 3 is a schematic representation of a work site and equipment staging area with equipment having the connectivity system of FIG. 2, according to an exemplary embodiment.
Figure 4:
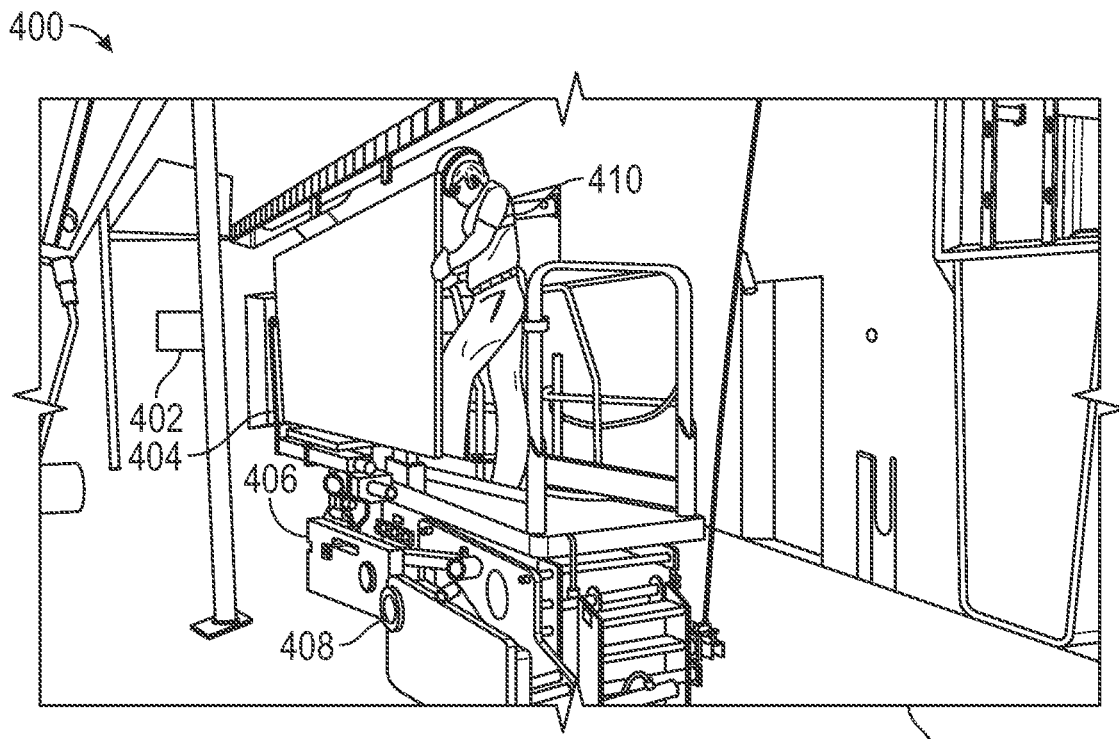
FIG. 4 is a picture representation of a work site with two work machines equipped with a coordinated control system, according to an exemplary embodiment.

As shown in FIG. 3, the coordinated control system 300 may be deployed on a work site 312 to monitor the position, status, control, etc. of one or more work machines 302, 304. Control information may be communicated via the connectivity module 306 to monitor equipment commands for tasks requiring more than one work machine 310. For example, coordinated control system 300 may monitor and store information relevant for determining movement controls for one or more work machine 310 within the same worksite equipment grouping. The coordinated control system 300 may record movement controls for the current session (e.g., task, deployment, etc.) and save the movement controls to a local or remote memory. In some embodiments, the coordinated control system 300 may monitor and record the previous movement controls of a machine for a given task associated with a client, worksite type (e.g., residential, commercial, etc.), operator, and proximity to other assigned work machines on the worksite (e.g., within a worksite equipment grouping). For example, as shown in FIG. 4, a plurality of work machines 406, 408 connected to the coordinated control system 400 via the connectivity module 402 may collaboratively perform tasks on a jobsite 412. In such an example, the tasks may require more than one work machine 406, 408, for example emplacing a section of drywall 404 that is too large to be handled by a single work machine 406, 408. In still such an example, the coordinated control system 400 may record information related to the task, operators, movement control, and proximity of the two work machines 406, 408.

In some embodiments, movement controls include a real-time movement command, wherein movement controls are reported based on the work machine's immediate (e.g., most recent) status, condition, and/or criteria at the time of movement controls are requested from the coordinated control system 400. In some embodiments, movement controls may include movement data over a period of time or particular operation selected by the user. For example, a user may generate and/or request a real-time movement report using a mobile application (e.g., mobile app 272) and the coordinated control system 400 may be configured to generate the movement report stored within the movement control information.

In some embodiments, the operator supplies an input to the coordinated control system 400 to designate task or session information, such as the kind and type of task or work being performed (e.g., painting, framing, lifting, emplacing drywall, etc.). In other embodiments, the task information is supplied to the coordinated control system 400 by someone other than the operator (e.g., manager, owner, etc.). In still other embodiments, the task information is not provided to the coordinated control system 400.

Figure 5:
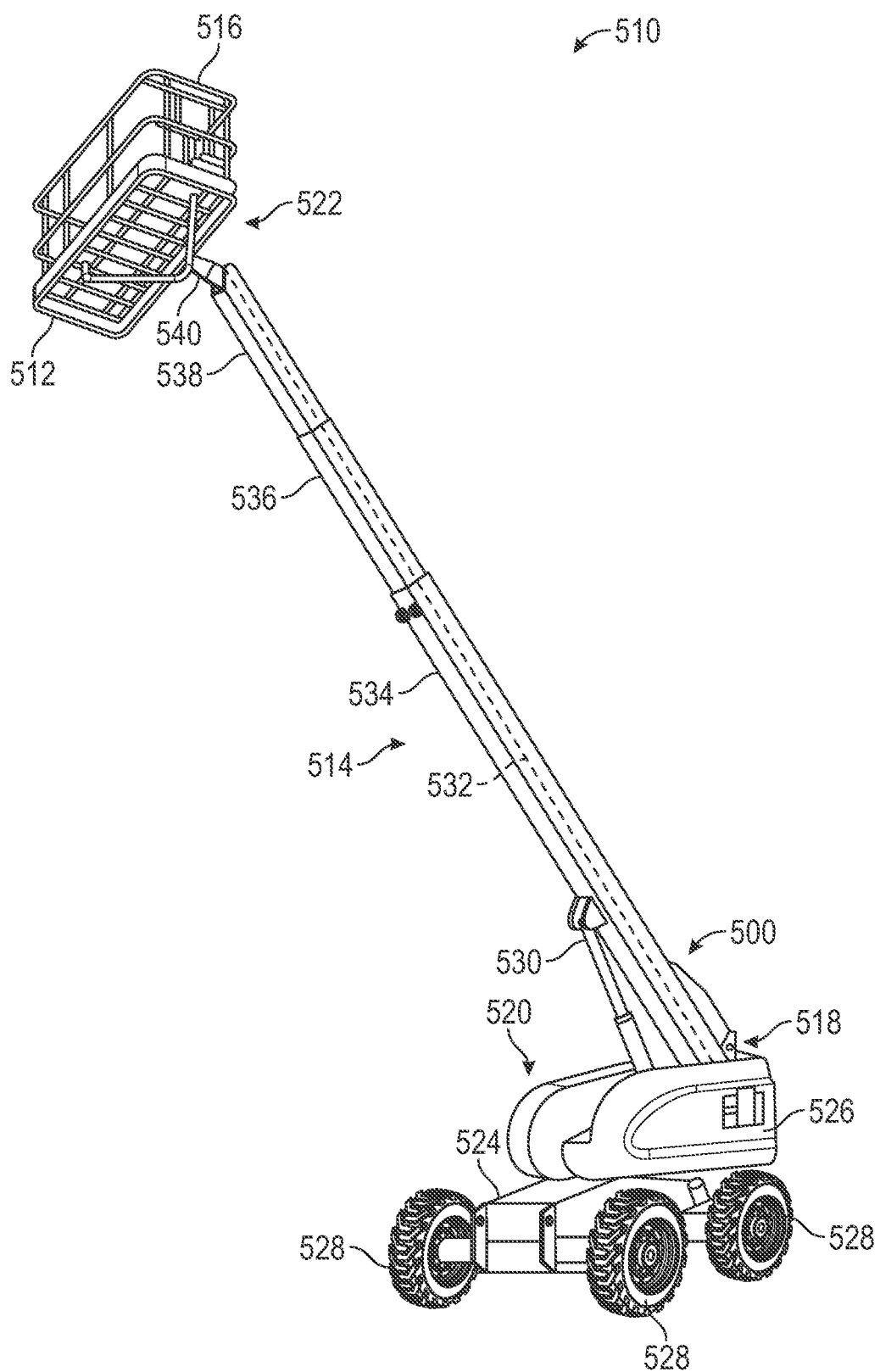
FIG. 5 is a perspective view of a telescoping boom lift with a coordinated motion system equipped, according to an exemplary embodiment.

As shown in FIG. 5, working equipment in a telescoping boom lift configuration with a coordinated control system 500, is shown as boom lift 510. Boom lift 510 includes a chassis or ground console, shown as chassis 520, and a work implement (e.g., a work platform, forks, a bucket, etc.), shown as platform 512. The platform 512 is coupled to the chassis 520 by a boom assembly, shown as boom 514. According to an exemplary embodiment, platform 512 supports one or more workers or operators. In some embodiments, the boom lift 510 includes an accessory or tool, shown as welder 516, coupled to the platform 512 for use by the worker. In other embodiments, the platform 512 is equipped with other tools for use by a worker, including pneumatic tools (e.g., impact wrench airbrush, nail guns, ratchets, etc.), plasma cutters, and spotlights, among other alternatives. In other embodiments, the boom lift 510 includes a different work implement coupled to the boom 514 (e.g., a saw, drill, jackhammer, lift forks, etc.) in place of or addition to the platform 512. Accordingly, the boom lift 510 may be configured as a different type of lift device, such as a telehandler, a vertical lift, etc.

The boom 514 has a first or proximal end 518 pivotally coupled to the chassis 520 and a second or distal end 522 opposite the proximal end 518. The distal end 522 is pivotally coupled to the platform 512. By pivoting the boom 514 at the proximal end 518, the platform 512 may be elevated or lowered to a height above or below a portion of the chassis 520. The boom 514 has a plurality of telescoping segments that may be configured to facilitate movement of the distal end 522 and the platform 512 closer to or away from the proximal end 518 and the chassis 520.

As shown in FIG. 5, the chassis 520 includes a chassis, base, or frame, shown as base frame 524. The base frame 524 is coupled to a turntable 526. According to exemplary embodiment, the proximal end 518 of the boom 514 is pivotally coupled to the turntable 526. According to an alternative embodiment, the chassis 520 does not include a turntable 526 and the boom 514 is coupled directly to the base frame 524 (e.g., the boom 514 may be provided as part of a telehandler). According to still another alternative embodiment, the boom 514 is incorporated as part of an articulating boom lift that includes multiple sections coupled to one another (e.g., a base section coupled to the chassis 520, an upper section coupled to the platform 512, and one or more intermediate sections coupling the base section to the upper section, etc.).

As shown in FIG. 5, the boom lift 510 is mobile and the base frame 524 includes tractive elements, shown as wheel and tire assemblies 528. The wheel and tire assemblies 528 may be driven using a prime mover and steered to maneuver the boom lift 510. In other embodiments, the base frame 524 includes other devices to propel or steer the lift device 10 (e.g., tracks). In still other embodiments, the boom lift 510 is a trailer that is towed by another vehicle, and the base frame 524 includes one or more wheels or elements configured to support the boom lift 510. In still other embodiments, the boom lift 510 is a stationary device and the base frame 524 lacks any wheels or other elements to facilitate the movement of the boom lift 510 and may instead include legs or other similar structures that facilitate stationary support of the boom lift 510.

Figure 6:
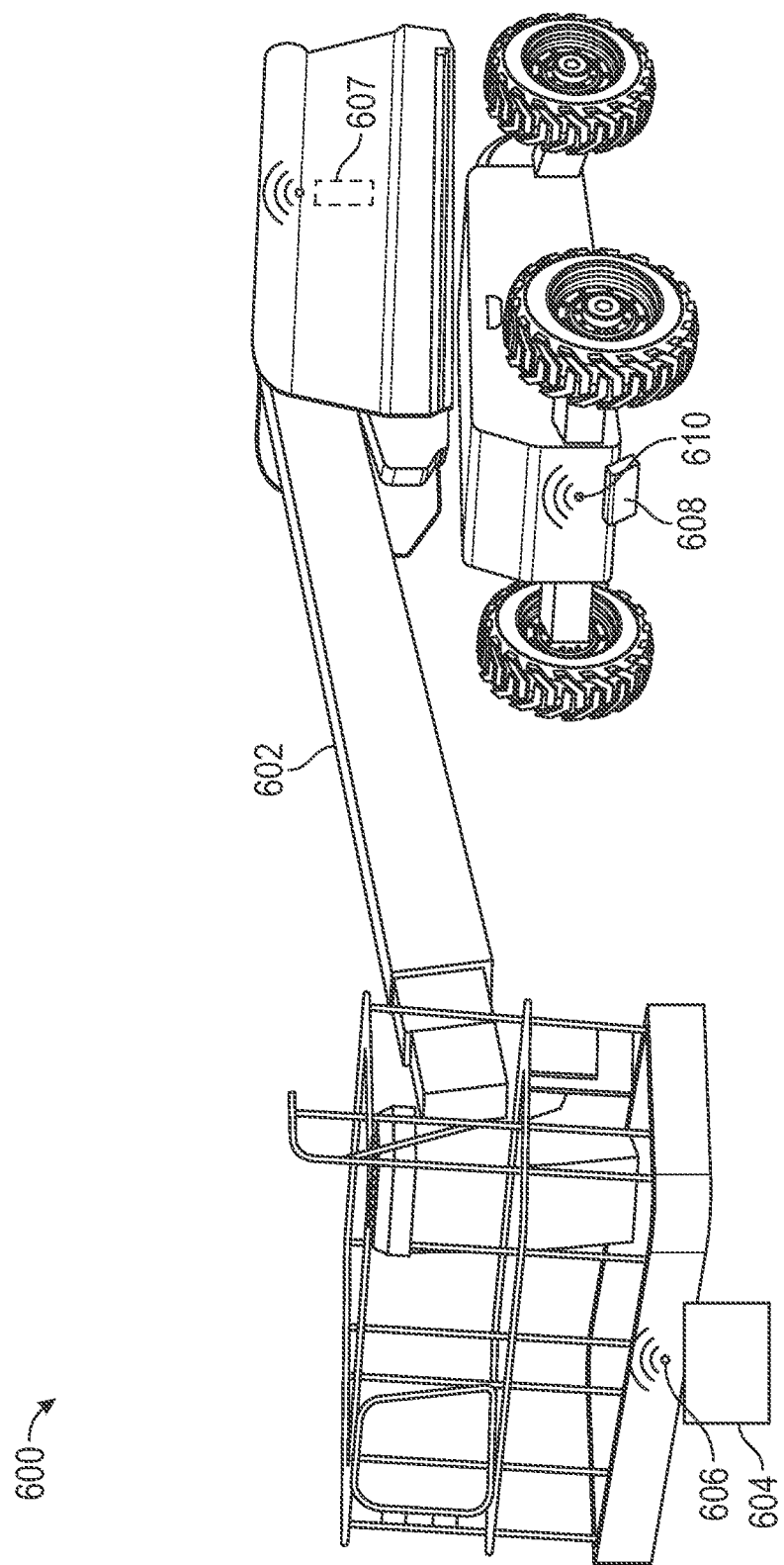
FIG. 6 is a picture representation of a work machine with a coordinated motion system equipped, according to an exemplary embodiment.

As shown in FIG. 6 a telescoping boom lift 602 is equipped with a coordinated control system 600. The telescoping boom lift 602 has a sensor cluster 604 wirelessly connected 606 to the controller 607, and a second sensor cluster 608 wirelessly connected 610 to the controller 607. Sensor clusters 604, 608 may include at least one of proximity sensors, temperature sensors, accelerometers, pressure sensors, light sensors, IR sensors, weight sensors, gyroscopic sensors, and still other suitable sensors for use with the coordinated control system 600. In some embodiments, the sensor clusters 604, 612 are configured to detect the presence of an operator positioned within the operator platform (e.g., using a light sensor, using an IR sensor, using a weight sensor, etc.) or movement of the machine (e.g., using an accelerometer or gyroscopic sensor) which may indicate active movement control of the machine. In such an example, the sensor clusters 604, 612 may cause the coordinated control system 600 to record relevant characteristics such as a platform load, a duration of time, user commands, electrical loads, hydraulic loads, machine location, position, and orientation conditions, and still other characteristics for monitoring equipment motion.

Figure 7:
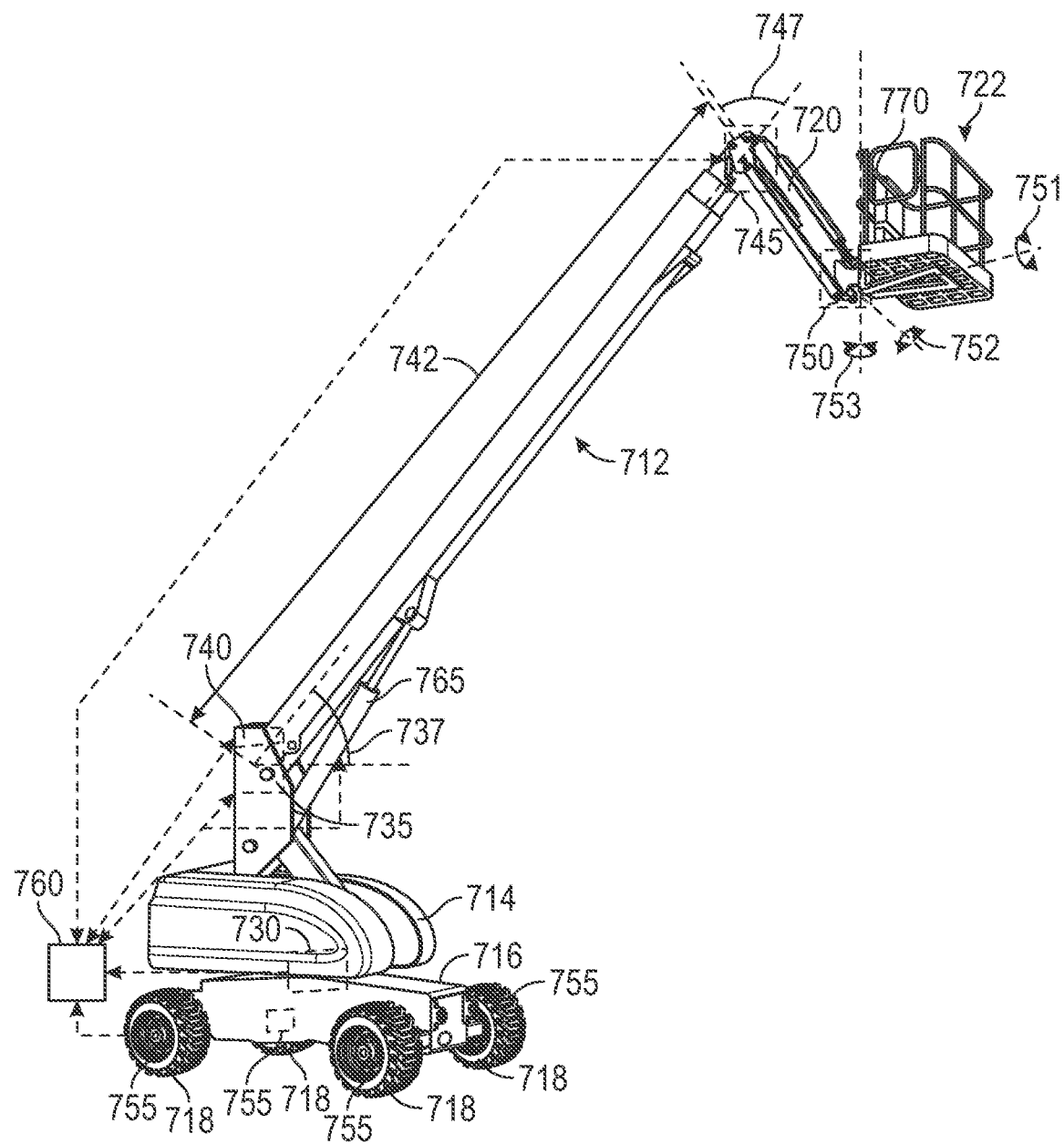
FIG. 7 is a picture representation of a telescoping boom lift with a coordinated motion system equipped, according to an exemplary embodiment.

As shown in FIG. 7, a telescoping boom lift 710 is equipped with a coordinated control system 700. The telescoping boom lift 710 includes sensors at various locations on the telescoping boom lift 710 configured to determine and detect the current position and/or status of the telescoping boom lift 710. The telescoping boom lift 710 includes boom assembly 712, base assembly 714, chassis 716, wheels 718, platform arm 720, and platform 722. The telescoping boom lift 710 may have substantially similar features as boom lift 510. As shown, telescoping boom lift 710 includes a first sensor, shown angular position sensor 730, a second sensor, shown as boom angle sensor 735, a third sensor, shown as boom extension sensor 740, a fourth sensor, shown as platform arm angle sensor 745, a fifth sensor, shown as platform sensor 750, and tractive element sensors, shown as wheel sensors 755. As shown, the angular position sensor 730 is configured to detect the angular positon of the boom assembly 712 relative to the chassis 716 as base assembly 714 rotates on chassis 716. Boom angle sensor 735 may be configured to measure boom angle 737. Boom angle 737 may be defined as an angle between the boom assembly and a horizontal plane. Boom extension sensor 740 may be one or more sensors configured to detect boom extension. Boom extension may be defined as the change in length 742 of boom assembly 712 from a nested position (See, e.g., FIG. 7) to an extended position (See, e.g., FIG. 5). Platform arm angle sensor 745 may be configured to detect the platform arm angle 747. The platform arm angle 747 may be defined as the angle between a longitudinal axis of platform arm 720 and a longitudinal axis of the boom assembly 712. Platform sensor 750 may be one or more sensors configured to detect the roll 751, pitch 752, and yaw 753 of platform 722 relative to the platform arm 720 or chassis 716. In some embodiments, platform sensor 750 is configured to sense the load (e.g., weight) supported by platform 722. Wheel sensors 755 may be configured to detect the angular rotation of wheels 718 and/or the angular offset between the respective planes containing wheels 718 to determine the direction of travel and/or wheel 718 position relative to the chassis 716. Sensors 730, 735, 740, 745, 750, 755 may be communicably coupled with controller 760 by a wired or wireless connection. In some embodiments, one or more sensors 730, 735, 740, 745, 750, 755 may be part of an actuator. For example, boom angle sensor 735 may be part of hydraulic actuator 765 which may indirectly measure boom angle 737 by determining the extension of the hydraulic actuator 765. In an exemplary embodiment, sensors 730, 735, 740, 745, 750, 755 may be used to determine the position of the platform 722 relative to the chassis 716.

The sensors 730, 735, 740, 745, 750, 755 may be substantially similar to or different than the sensors of sensor array 68. In an exemplary embodiment, sensors 730, 735, 740, 745, 750, 755 include at least one of inductive angle sensors, weight sensors, proximity sensors, pressure sensors, hydraulic sensors, strain gauges, magnetostrictive sensors, variable-resistance sensors, variable inductance sensors, and still other suitable sensors for monitoring the status, position, and other criteria of work equipment, all in communication with controller 760. Controller 760 may be substantially similar to or different than controller 44. In an exemplary embodiment, sensors 730, 735, 740, 745, 750, 755 are configured to directly or indirectly measure positional characteristics of the telescoping boom lift 710.

As shown in FIG. 7, coordinated control system 700 may monitor or record positions 732, 737, 742, 747, 752, 757 based on commands sent from the controller 760 to actuators (e.g., hydraulic actuator 765) on the telescoping boom lift 710 with or without the need for sensors 730, 735, 740, 745, 750, 755. In some embodiments, the coordinated control system 700 may monitor or record the positions 732, 737, 742, 747, 752, 757 based on inputs from the one or more control panels (e.g., platform control panel 770). In an exemplary embodiment, the coordinated control system 700 records positions 732, 737, 742, 747, 752, 757 using a combination of sensors 730, 735, 740, 745, 750, 755 and controller commands.

As shown in FIG. 7, movement control is tracked on an equipment position basis. As shown in FIG. 7, the coordinated control system 700 may record and monitor positions and orientations of various components (e.g., boom assembly 712, platform arm 720, wheels 718, chassis 716, platform 722, base assembly 714, etc.) of the telescoping boom lift 710 and compare the monitored and stored positions and orientations to their respective maximums (e.g., maximum boom extension, maximum platform pitch 752, maximum platform roll 751, maximum platform yaw 753, maximum boom angle 737, etc.) or to other criteria. In an exemplary embodiment, the position, orientation, status, etc. of the telescoping boom lift 710 may be communicatively coupled to the position, orientation, status, etc. of a second telescoping boom lift 710. The position, orientation, status, etc. may be entered by a user of the coordinated control system 700, or may be preprogramed by the manufacturer of the coordinated control system 700.

Figure 8:
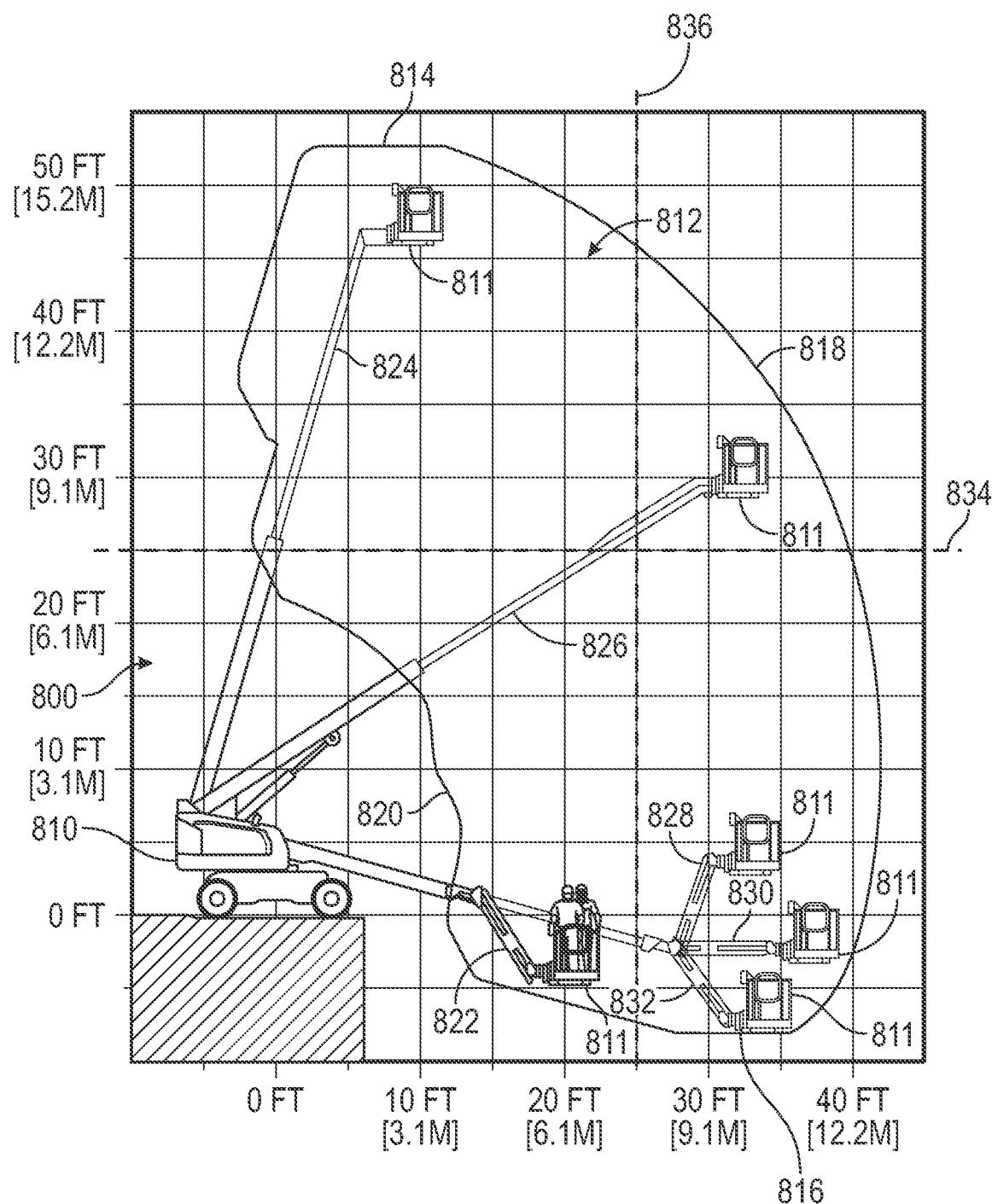
FIG. 8 is a schematic representation of a telescoping boom lift with a coordinated control system equipped showing a work area of the telescoping boom lift, according to an exemplary embodiment.

As shown in FIG. 8, a work machine, shown as telescoping boom lift 810, is equipped with a coordinated control system 800. The working range of the equipment (e.g., working area, etc.) is shown as work area 812. Work area 812 is bounded by an upper limit 814, a lower limit 816, an outer limit 818, and an inner limit 820. Limits 814, 816, 818, 820 are physical limitations or programmed limitations of the telescoping boom lift 810. The upper limit 814 may be the maximum height of the telescoping boom lift 810. The lower limit 816 may be the minimum height of the telescoping boom lift 810. The outer limit 818 may be the maximum reach of the telescoping boom lift 810. The inner limit 820 may be the minimum reach of the telescoping boom lift 810. As shown in FIG. 8, the limits 814, 816, 818, 820 vary based on the reach and height of the telescoping boom lift 810. Similarly, the maximum weight capacity is a function of the reach and height of the telescoping boom lift 810 and the work area 812 may be shaped differently depending on the platform 811 load (e.g., weight of operators, materials, occupants, etc.) to prevent the telescoping boom lift 810 from tipping. For example, the outer limit 818 may be closer to the inner limit 820 for a load heavier than shown in FIG. 8 to prevent the telescoping boom lift 810 from tipping.

In some embodiments, the coordinated control system 800 calculates equipment position based on the position of the platform 811 within the work area 812. As shown in FIG. 8, platform 811 is shown in a first position 822, a second position 824, a third position 826, a fourth position 828, a fifth position 830, and a sixth position 832. As shown, the first position 822 is near the lower limit 816 and the inner limit 820, the second position 824 is near the upper limit 814 and the outer limit 818, the third position 826 is located near the outer limit 818, the fourth position 828 and fifth position 830 are located near the lower limit 816 and the outer limit 818. The sixth position 832 is located on the lower limit 816.

Figure 9:
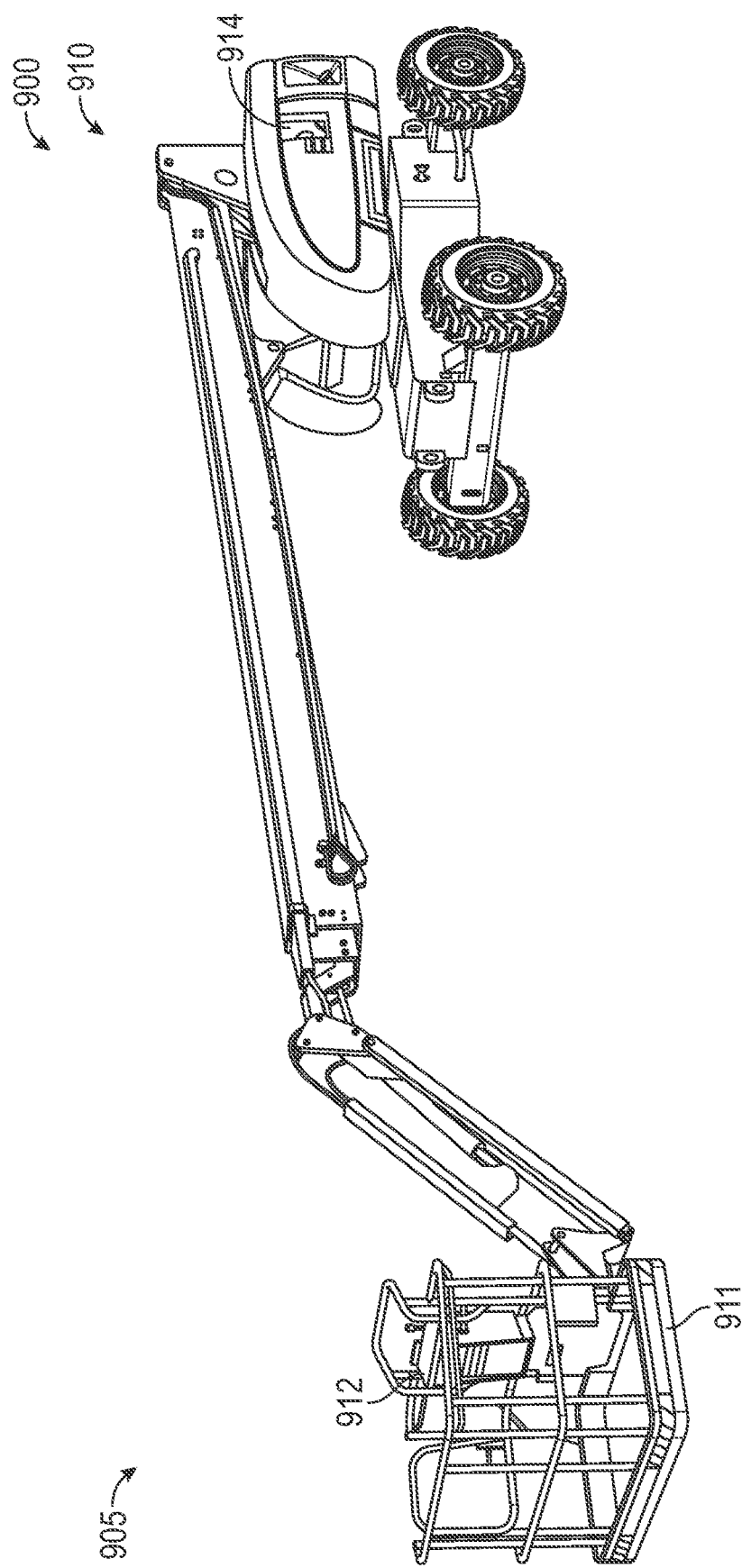
FIG. 9 is a picture representation of a telescoping boom lift in a lowered position with a coordinated control system equipped, according to an exemplary embodiment.

As shown in FIG. 9, a boom lift 910 is equipped with a coordinated control system 900 and is shown in a lowered position 905. The boom lift 910 and the coordinated control system 900 may be the same as or different than the telescoping boom lift 710 and coordinated control system 700. An operator of the boom lift 910 may enter the platform 911 while the boom lift 910 is in the position shown (e.g., a lowered position). The operator may control the boom lift 910 using the platform control panel 912 or the base control panel 914. In some embodiments, the coordinated control system 900 may monitor and record position, orientation, status, etc. upon the operator entering the platform 911. In other embodiments, the coordinated control system may monitor and record position, orientation, status, etc. before or after the operator enters the platform 911.

Figure 10:
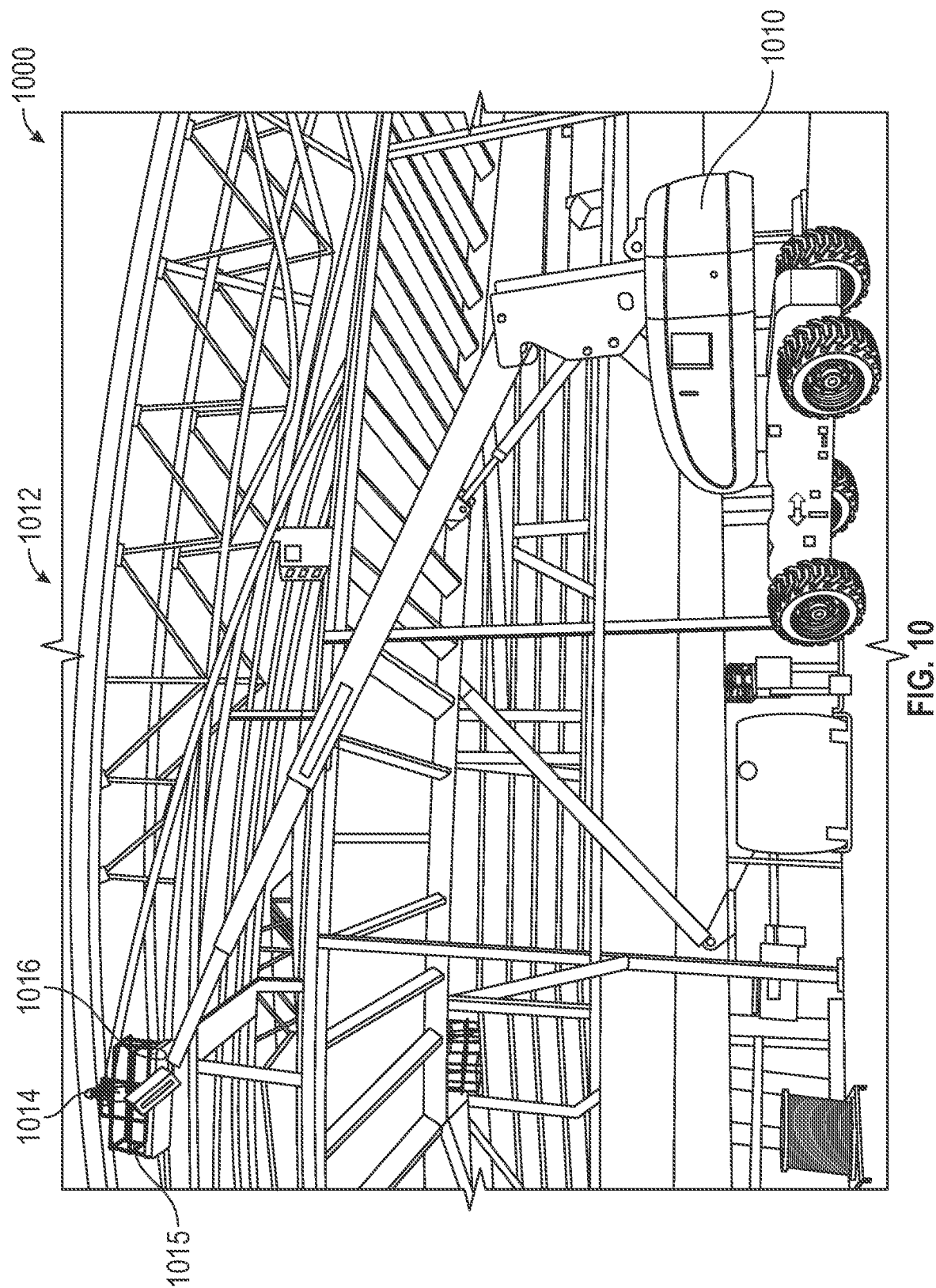
FIG. 10 is a picture representation of a telescoping boom lift in a raised position with a coordinated control system equipped, according to an exemplary embodiment.

As shown in FIG. 10, a boom lift 1010 is equipped with a coordinated control system 1000. The boom lift 1010 is shown in a raised position 1012. An operator 1014 is operating the boom lift 1010 using the platform controls 1015 on the platform 1016 and the coordinated control system 1000 is recording position, orientation, status, etc. information about boom lift 1010 (e.g., boom height, command history, loads, sensor values, user inputs, controller outputs, elapsed time, date, operator, worksite, task, manager, equipment location, equipment position, etc.).

Figure 11:
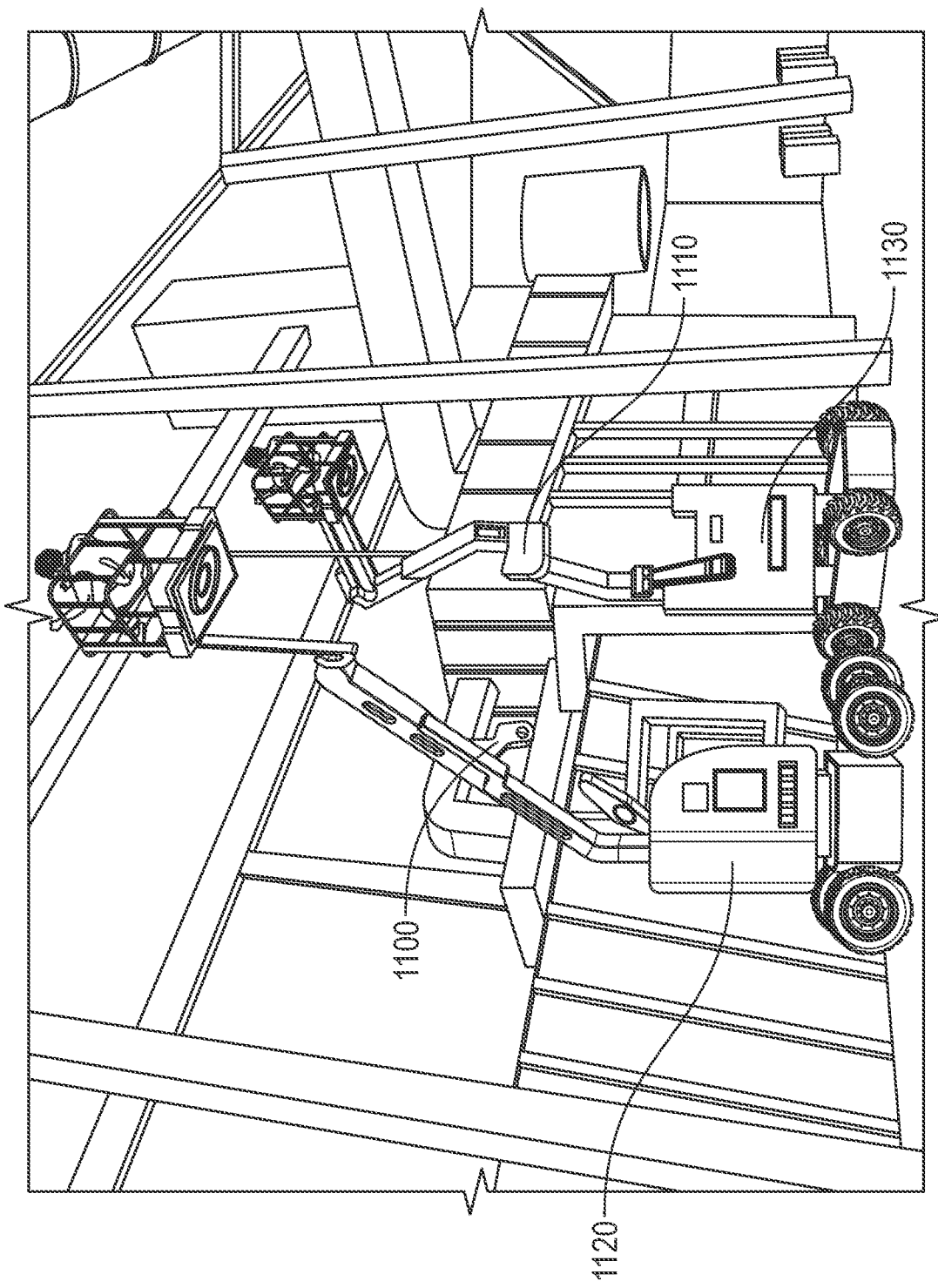
FIG. 11 is a picture representation of work machines with a coordinated control system and in coordinated motion with one another, according to an exemplary embodiment.

Referring to FIG. 11, a first work machine 1100 and a second work machine 1110 are shown in coordinated motion (e.g., mirror, follow, mimic, augment, supplement, etc.). The first work machine 1100 may be operably coupled to a first coordinated control system 1120. The second work machine 1110 may be operably coupled to a second coordinated control system 1130. By way of example, the first and second coordinated control systems 1120, 1130 may each include their own respective controller and processor. For example, the first coordinated control system 1120 includes a first controller and a first processor and the second coordinated control system 1130 includes a second controller and a second processor. The first work machine 1100 and the second work machine 1110 are in coordinated motion, where the work machines 1100, 1110 move in substantially the same fashion (e.g., move in a horizontal direction, extend in a vertical direction, tilt in a rotational direction, etc.). As shown, the first work machine 1100 and the second work machine 1110 move in substantially the same direction, at substantially the same speed, to lift one or more operators, implements, object, etc. In some embodiments, the first work machine 1100 and the second work machine 1110 may not move in substantially the same direction and/or have substantially the same speed. In such an embodiment, the direction and speed of the first work machine 1100 and the second work machine 1110 may be determined on a task. Although only one movement is shown, the first work machine 1100 and the second work machine 1110 may operate in any combination of movement or tasks. By way of example, the first work machine 1100 may be controlled by an operator, and the second lift device 1110 may coordinate motion with the first lift device 1100. In other embodiments, the first work machine 1100 and the second work machine 1110 may be controlled by an operator at substantially the same moment. In still other embodiments, the second work machine 1110 may receive a motion command via the second coordinated control system 1130 prior to the first work machine 1100 receiving a motion command via the first coordinated control system 1120.

Figure 12:
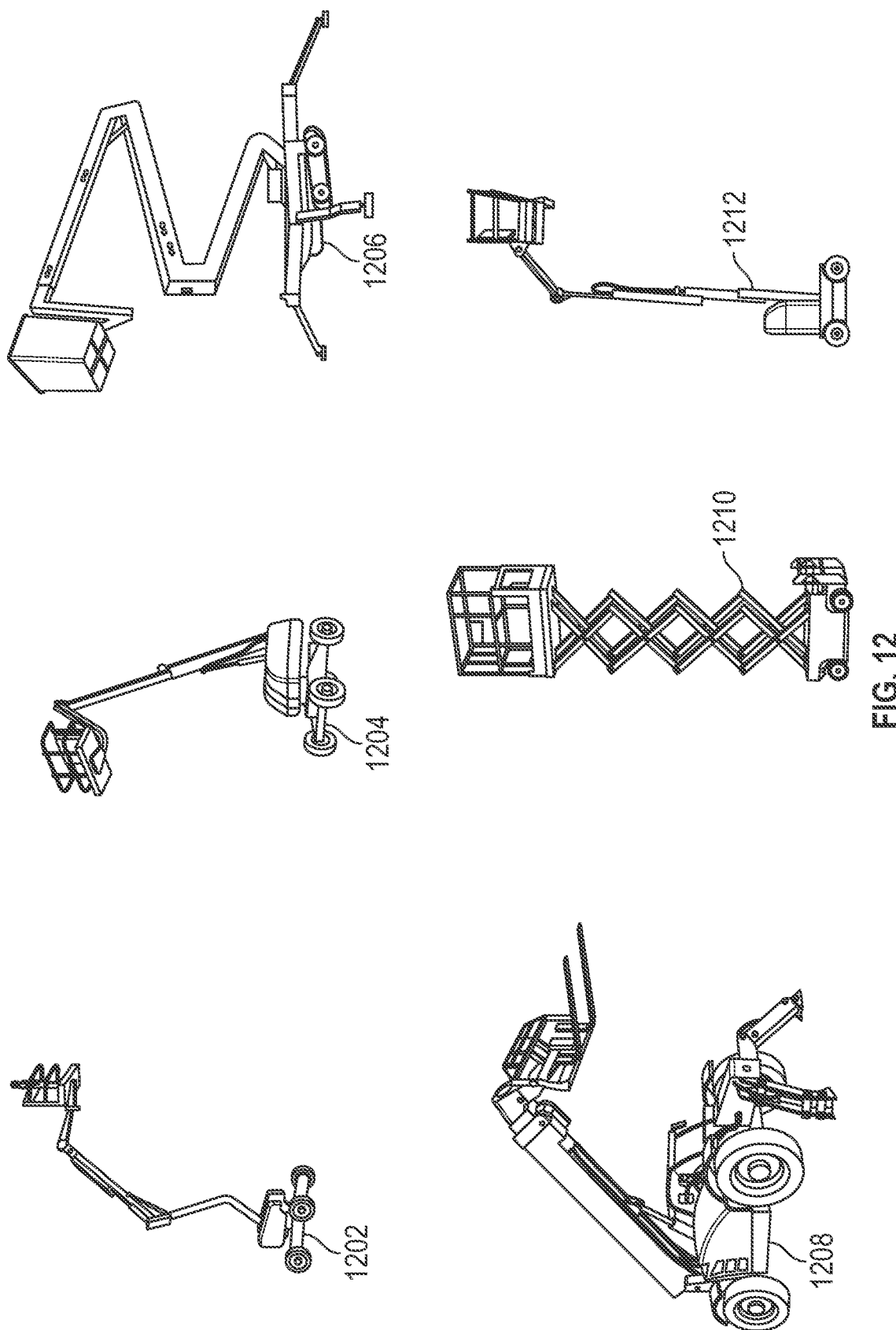
FIG. 12 is a picture representation of work machines configured for use with a coordinated control system, according to an exemplary embodiment.

As shown in FIG. 12, the coordinated control system and methods described above, and further described below, may be implemented using various work machines 20 such as an articulating boom lift 1202 as shown in FIG. 12, a telescoping boom lift 1204 as shown in FIG. 12, a compact crawler boom lift 1206 as shown in FIG. 12, a telehandler 1208 as shown in FIG. 12, a scissor lift 406, 408, and 1210 as shown in FIG. 4, and/or a toucan mast boom lift 1212 as shown in FIG. 12.

Figure 13:
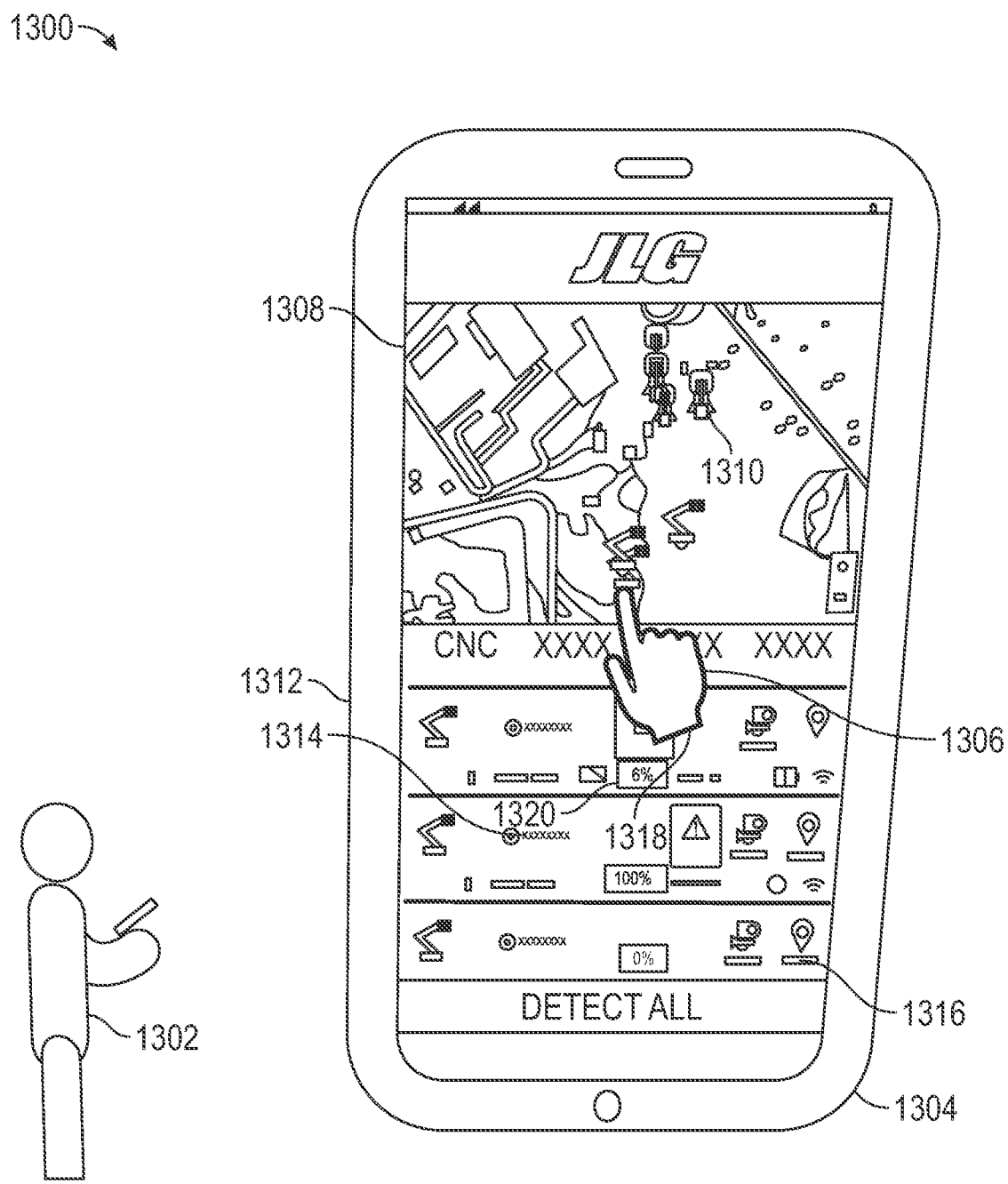
FIG. 13 is a combined picture and drawing representation of a view of a coordinated control system user interface, according to an exemplary embodiment.

As shown in FIG. 13, a user 1302 may use the coordinated control system 1300 (e.g., user input system, etc.) by interacting 1318 with an application hosted on a user device 1304 that generates a user interface 1308. The user device 1304 and work machines 1306 are interconnected via the connectivity system 218 by a transceiver. The user 1302 selects a work machine 1306 from a view 1308 of a group of work machines 1306 connected to the connectivity system 218 at a work site. The user interface 1308 may depict, for example, imagery of a work site 1308 with overlays of machine locations (e.g. a map) 1310 and information regarding machine specific information including status (e.g. fuel state, state of charge, etc.) 1312, 1314, 1316. The application may dynamically filter the map to illustrate the total machine population, locations, statuses, and orientations of individual machines in the population. In some examples, a remote user may apply filters (e.g. filters related to machine status including self-test, fuel level, state of charge, position, orientation, etc.) to a specific work site network much the same as can be done locally via an application on a mobile user device (e.g. in the instance where a remote user can apply the desired user configurable rules to assist a local user without the need of mobile application use). The user may select a machine or group of machines using an application and communicate with the machine or group of machines (directly or via a cloud) to have that machine provide position information. The first control system and the second control system are configured to receive the signal and thereafter operate the first actuator of the first work machine and the second actuator of the second work machine in a coordinated mode of operation. The user input system is configured to provide, and the first control system and the second control system are configured to receive, the signal simultaneously thereby reducing latency between motion of the one or more work machines thereby reducing latency between motion of the one or more work machines in a coordinated mode of operation.

Figure 14:
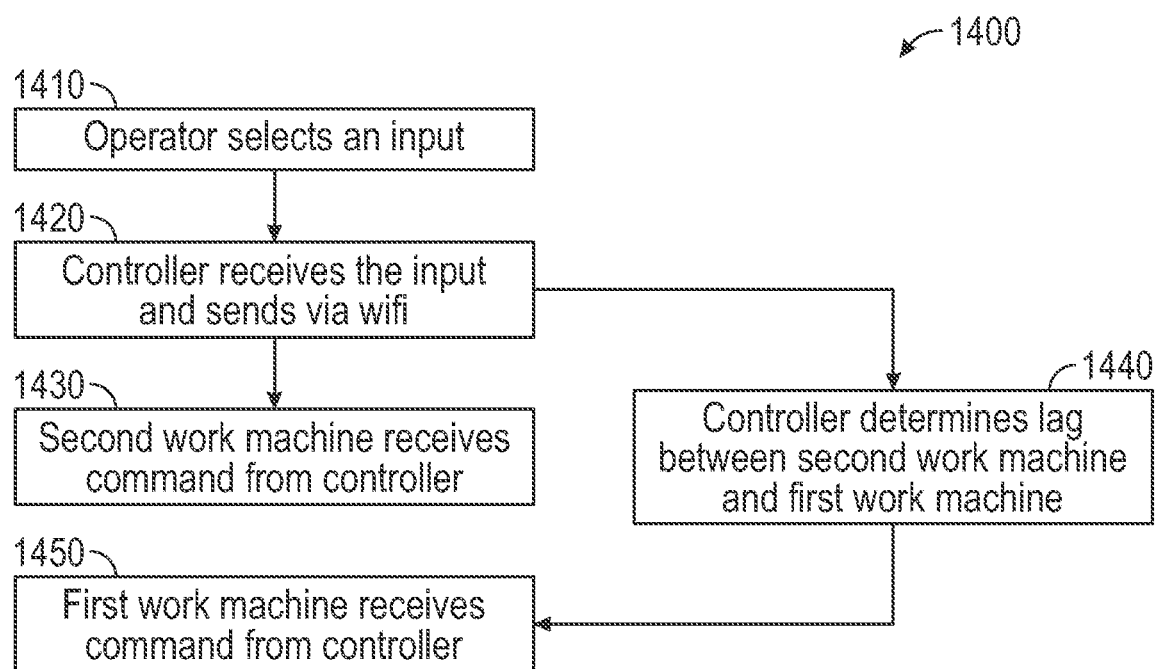
FIG. 14 is a block diagram of a controller for coordinated motion of work machines, according to an exemplary embodiment.

Referring now to FIG. 14, a control system 1400 for coordinated motion is shown, according to an exemplary embodiment. The control system 1400 may be configured for use in one or more work machines (e.g., boom lift, scissor lift, telescoping boom lift, etc.) where the at least one or more work machines are communicably coupled to the control system 1400. The control system 1400 operates by selecting an input 1410 from a user, operator, or the like. The input 1410 can be a command to move the boom in a direction (e.g., x-direction, y-direction, z-direction, or combination of the directions) or may be a command to move the work machine (e.g., drive in a direction). The input 1410 may be sent to a controller 1420 where the controller 1420 processes the command. The controller 1420 may send the command to the second work machine 1430. As can be appreciated, the controller 1420 may calculate a lag time 1440 between at least the second work machine 1430 and a first work machine 1450. The lag time 1440 is the time difference between the first work machine 1450 and the second work machine 1430 starting the command. Once the second work machine 1430 has received the command, the controller 1420 delays sending the command the duration of the lag time 1440, and then may send the command to the first work machine 1450. As can be appreciated, both the first work machine 1450 and the second work machine 1430 may receive the command at about the same moment (e.g., within seconds of each other, etc.). In such an example, the first work machine 1450 and the second work machine 1430 may move in a coordinated fashion. In some embodiments, the first work machine 1450 may be the main work machine and the second work machine 1430 may be the slave work machine, where the slave work machine follows the main work machine.

In some embodiments, the control system 1400 may be operably coupled to more than two work machines. In such an embodiment, the controller 1420 may calculate an additional lag time 1440 for each additional work machine. For example, if the control system 1400 is operably coupled to four work machines, the controller 1420 may calculate three different lag times 1440, where the controller 1440 may send the command to the machine with the highest lag time 1440 first.

Figure 15:
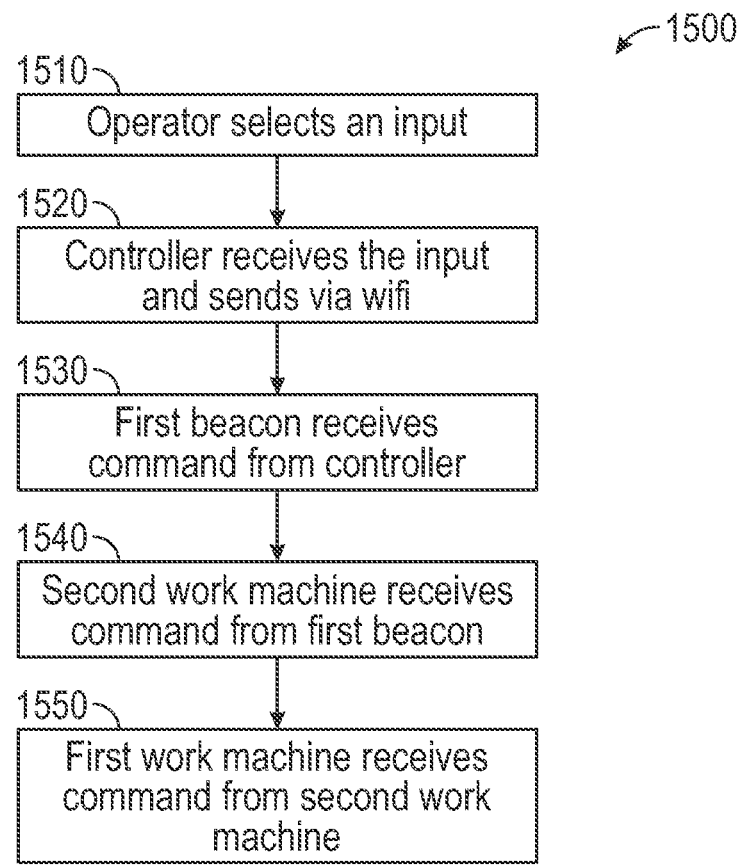
FIG. 15 is a block diagram of a controller for coordinated motion of work machines, according to an exemplary embodiment.

Referring now to FIG. 15, a control system 1500 for coordinated motion is shown, according to an exemplary embodiment. The control system 1500 may be configured for use in one or more work machines (e.g., boom lift, scissor lift, telescoping boom lift, etc.) where the at least one or more work machines are communicably coupled to the control system 1500. The control system 1500 operates by selecting an input 1510 from a user, operator, or the like. The input 1510 can be a command to move the boom in a direction (e.g., x-direction, y-direction, z-direction, or combination of the directions) or may be a command to move the work machine (e.g., drive in a direction). The input 1510 may be sent to a controller 1520 where the controller 1520 processes the command. The controller 1520 may then send the command to a first beacon 1530, where the first beacon 1530 is operably coupled to a first work machine 1550. Additionally, the first beacon 1530 may be configured to monitor parameters of the first work machine 1550 (e.g., status, position, orientation, etc.). The first beacon 1530 may then send the command to a second work machine 1540. While the second work machine 1540 processes the command, the second work machine 1540 may also send the command back to the first work machine 1550. The first work machine 1550 and the second work machine 1530 may then simultaneously move to perform a specific task.

In some embodiments, the control system 1500 may be operably coupled to more than two work machines. In such an embodiment, the additional work machines may include a beacon that may be configured to receive a command, send the command, and monitor parameters of the respective work machines.

Figure 16:
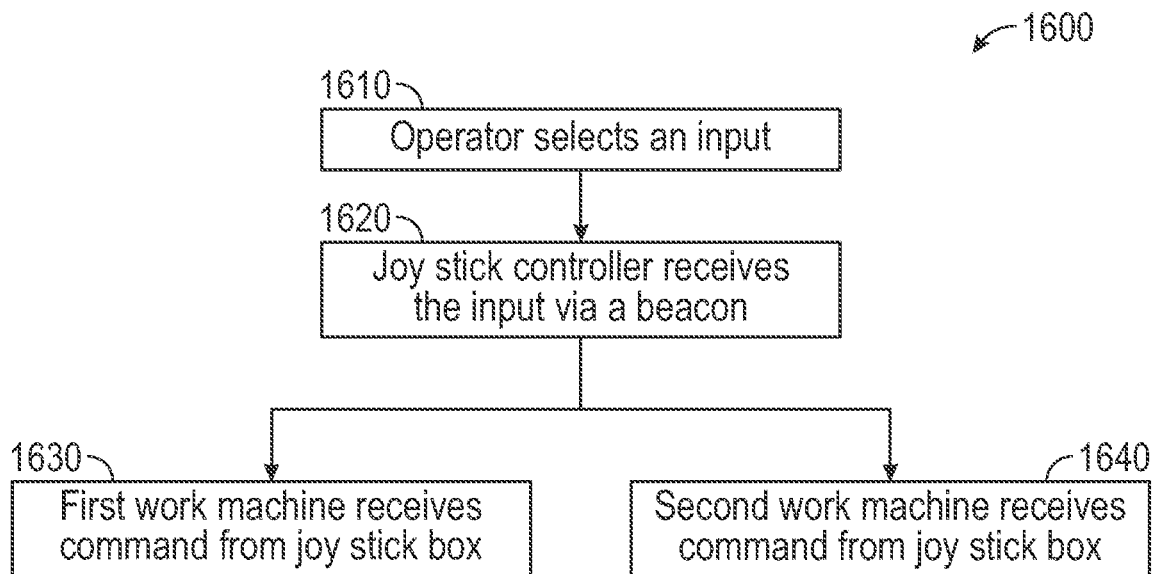
FIG. 16 is a block diagram of a controller for coordinated motion of work machines, according to an exemplary embodiment.

Referring now to FIG. 16, a control system 1600 for coordinated motion is shown, according to an exemplary embodiment. The control system 1600 may be configured for use in one or more work machines (e.g., boom lift, scissor lift, telescoping boom lift, etc.) where the at least one or more work machines are communicably coupled to the control system 1600. The control system 1600 operates by selecting an input 1610 from a user, operator, or the like. The input 1610 can be a command to move the boom in a direction (e.g., x-direction, y-direction, z-direction, or combination of the directions) or may be a command to move the work machine (e.g., drive in a direction). The input 1610 may be sent to a joy stick controller 1620, the joy stick controller 1620 operably coupled to one or more work machines. The joy stick controller 1620 may be selectively repositionable such to control a direction of travel of both a first work machine 1630 and a second work machine 1640. In some embodiments, the joy stick controller 1620 may be configured to control an extension or retraction of a boom assembly of at least one of the work machines 1630 and 1640. To be more precise, the joy stick controller 1620 may simultaneously send a command to the first work machine 1630 and the second work machine 1640, where both work machines 1630 and 1640 receive the command at approximately the same moment (e.g., within seconds of one another, etc.).

In some embodiments, the joy stick controller 1620 is operably coupled to at least more than two work machines. In such an embodiment, the joy stick controller 1620 may send the same control command to the additional work machines such to provide coordinated control to a fleet of work machines (e.g., more than two work machines, etc.). In some embodiments, the joy stick controller 1620 may provide a different control command to at least one work machine so that the fleet of work machines may operate on different tasks simultaneously.

Figure 17:
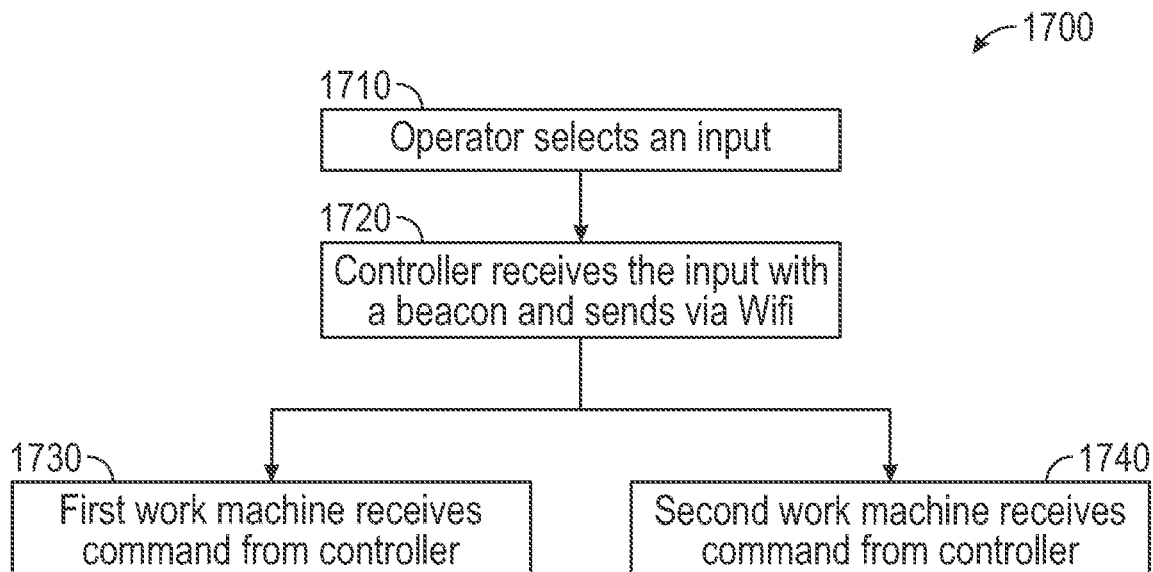
FIG. 17 is a block diagram of a controller for coordinated motion of work machines, according to an exemplary embodiment.

Referring now to FIG. 17, a control system 1700 for coordinated motion is shown, according to an exemplary embodiment. The control system 1700 may be configured for use in one or more work machines (e.g., boom lift, scissor lift, telescoping boom lift, etc.) where the at least one or more work machines are communicably coupled to the control system 1700. The control system 1700 operates by selecting an input 1710 from a user, operator, or the like. The input 1710 can be a command to move the boom in a direction (e.g., x-direction, y-direction, z-direction, or combination of the directions) or may be a command to move the work machine (e.g., drive in a direction). A controller 1720 receives and processes the input 1710 via a controller beacon. The controller 1720 simultaneously sends the command to both a first work machine 1730 and a second work machine 1740 via WiFi. As can be appreciated, both the first work machine 1730 and the second work machine 1740 receive the command at substantially the same moment (e.g., within 5 seconds of each other, within 10 seconds of each other, etc.). In such an embodiment, the first work machine 1730 and the second work machine 1740 move in a coordinated fashion. For example, a boom of the first work machine 1730 and a boom of the second work machine 1740 may extend or retract at the same rate. In another example, the first work machine 1730 and the second work machine 1740 may move in the same direction at substantially the same speed.

The controller 1720 may be operably coupled to work machines within the same job site. In some embodiments, the controller 1720 may be operably coupled to work machines outside of the same job site, where the controller 1720 may be positioned at a central location between the work machines.

In some embodiments, the controller 1720 may be operably coupled to more than two work machines. In such an embodiment, the controller beacon sends a simultaneous command to all the work machines, where all the work machines receive the command at substantially the same moment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

Figure 2:
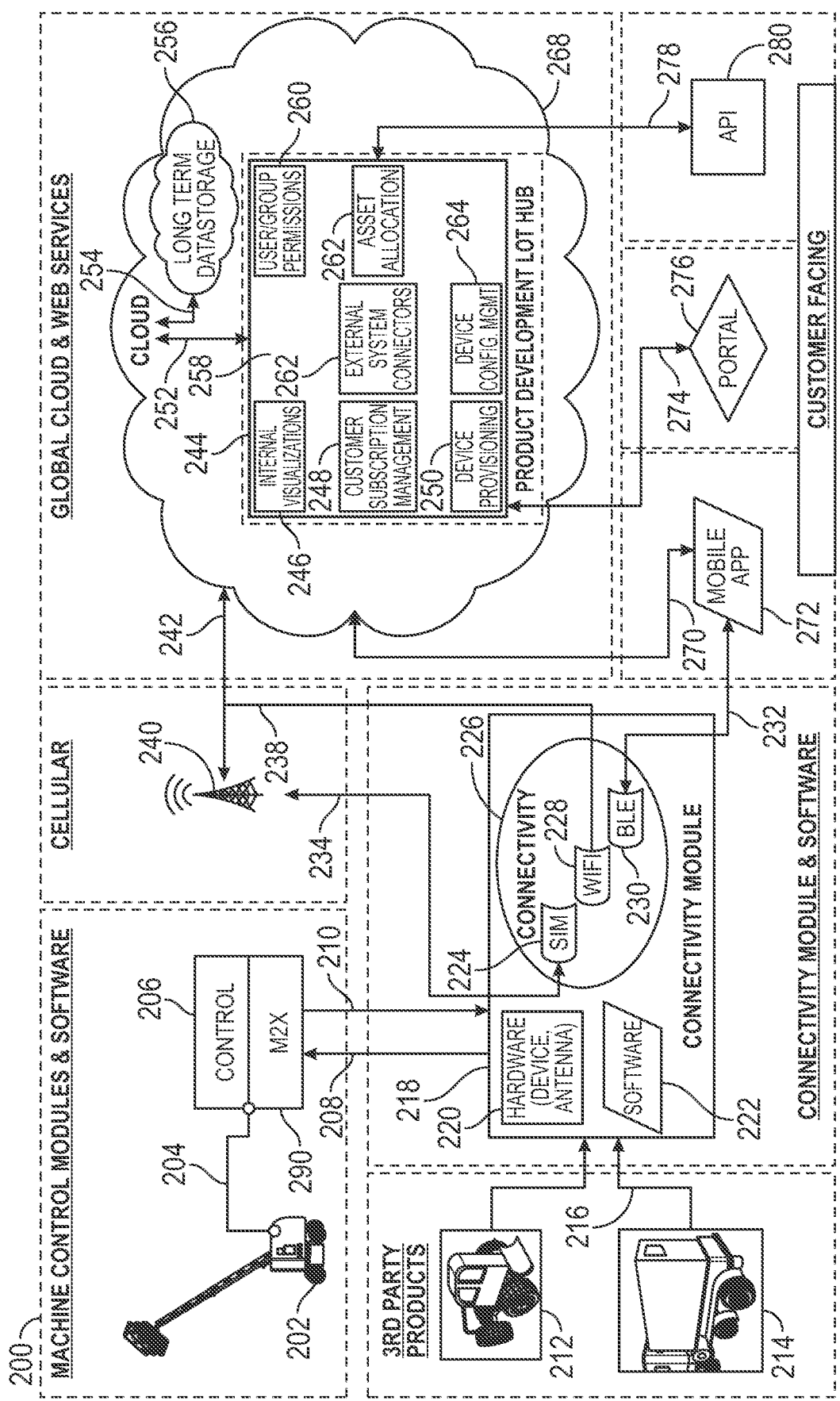
FIG. 2 is a schematic representation of a connectivity system including a coordinated control system, according to an exemplary embodiment.

While various circuits with particular functionality are shown in FIGS. 1-2, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle system comprising:
a first work machine comprising a first actuator and a first control system;
a second work machine comprising a second actuator and a second control system; and
a user input system comprising (a) a transceiver and (b) a user interface, wherein the user input system defines at least one of (i) a portion of the first control system of the first work machine, (ii) a portion of the second control system of the second work machine, or (iii) a third control system, wherein the user input system is configured to receive a user input via the user interface and provide a signal to both the first control system and the second control system;
wherein the first control system and the second control system are configured to receive the signal and thereafter operate the first actuator of the first work machine and the second actuator of the second work machine in a coordinated mode of operation,
wherein the user input system is configured to provide, and the first control system and the second control system are configured to receive, the signal simultaneously thereby reducing latency between motion of the first work machine and the second work machine in the coordinated mode of operation, wherein the first control system comprises a first controller, the second control system comprises a second controller, and the third control system comprises a third controller, and wherein the first controller sends a first signal to the third controller and the second controller sends a second signal to the third controller, wherein the first signal is a first response time of the first work machine and the second signal is a second response time of the second work machine, and wherein the third controller compares the first response time to the second response time to determine a lag time.

2. The vehicle system of claim 1, wherein the first work machine comprises a first sensor configured to detect a first signal, and the second work machine comprises a second sensor configured to detect a second signal.

3. The vehicle system of claim 2, wherein the first control system comprises a first controller configured to send the first signal to the user input system, and the second control system comprises a second controller configured to send the second signal to the user input system.

4. The vehicle system of claim 3, wherein the user input system further comprises a third controller operably coupled to the first and second controllers, the third controller configured to receive the first and second signals, and wherein the third controller compares the first and second signals to a signal threshold.

5. The vehicle system of claim 4, wherein the user input is a motion command of the first and second work machines, and wherein the first and second work machines perform the command at approximately the same rate.

6. The vehicle system of claim 1, wherein the third control system delays sending the command to one of the first control system and the second control system indicative of the lag time such that the first control system and the second control system receive the command at the same time.

7. The vehicle system of claim 1, wherein the signal comprises an input signal, wherein the first control system and the second control system are configured to determine control signals based on the input signal, and wherein the first control system and the second control system are configured to control the first actuator and the second actuator based on the control signals.

8. A vehicle system comprising:
a first work machine comprising a first actuator and a first control system;
a second work machine comprising a second actuator and a second control system; and
a user input system comprising (a) a transceiver and (b) a user interface, wherein the user input system defines at least one of (i) a portion of the first control system of the first work machine, (ii) a portion of the second control system of the second work machine, or (iii) a third control system, wherein the user input system is configured to receive a user input via the user interface and provide a signal to both the first control system and the second control system;
wherein the first control system and the second control system are configured to receive the signal and thereafter operate the first actuator of the first work machine and the second actuator of the second work machine in a coordinated mode of operation,
wherein the user input system is configured to provide, and the first control system and the second control system are configured to receive, the signal simultaneously thereby reducing latency between motion of the first work machine and the second work machine in the coordinated mode of operation, wherein the first work machine comprises a first sensor configured to detect a first position, and the second work machine comprises a second sensor configured to detect a second position, wherein the second control system sends a second signal indicative of the second position to the third control system, and wherein the user input system sends the signal to the first work machine and the second work machine responsive to the second signal, wherein the signal comprises a control signal, and wherein the first control system and the second control system are configured to control the first actuator and the second actuator based on the control signal.

9. A system comprising:
a first non-transitory computer-readable medium having instructions stored thereon that, when executed by one or more first processors, cause the one or more first processors to implement operations comprising:
controlling a first motor to drive a first actuator; and
sending a first signal from a first sensor of a first controller;
a second non-transitory computer-readable medium having instructions stored thereon that, when executed by one or more second processors, cause the one or more second processors to implement operations comprising:
controlling a second motor to drive a second actuator; and
sending a second signal from a second sensor of a second controller; and
a third non-transitory computer-readable medium having instructions stored thereon that, when executed by one or more third processors, cause the one or more third processors to implement operations comprising:
receiving the first signal from the first controller and the second signal from the second controller;
comparing the first signal and the second signal to a signal threshold to develop a third signal; and
sending a command via a third controller to the first controller and the second controller to move the first actuator and the second actuator indicative of the third signal, and
wherein the third controller detects a first response time of the first controller and a second response time of the second controller, and wherein the one or more third processors compares the first response time to the second response time.

10. The system of claim 9, wherein the first sensor detects a first position of the first actuator, and the second sensor detects a second position of the second actuator, and wherein the third controller compares the first position and the second position to the signal threshold.

11. The system of claim 10, wherein the third controller sends a command to the first controller to modify the first position of the first actuator responsive to the third signal.

12. The system of claim 11, wherein the third controller sends a commend to the second controller to modify the second position of the second actuator responsive to the third signal.

13. The system of claim 12, wherein the first controller and the second controller receive the third signal at the same time such that the first position of the first actuator and the second position of the second actuator are modified at the same time whereby the first actuator and the second actuator move in coordination.

14. The system of claim 9, wherein the third controller delays sending the command to one of the first controller and the second controller in response to determining a delay in the response time between the first response time and the second response time.

\* \* \* \* \*

UNITED STATES PATENT AND TRADEMARK OFFICE
CERTIFICATE OF CORRECTION

PATENT NO. : 11,746,500 B2  
APPLICATION NO. : 17/970844  
DATED : September 5, 2023  
INVENTOR(S) : Kobel et al.

Page 1 of 1

It is certified that error appears in the above-identified patent and that said Letters Patent is hereby corrected as shown below:

On the Title Page

Item (72) The inventors should be:  
Korry Kobel, Oshkosh, WI, USA.  
Fredric Yutzy, Oshkosh, WI, USA.  
Dan Adamson, Oshkosh, WI, USA.

Signed and Sealed this  
Twenty-first Day of May, 2024

Katherine Kelly Vidal  
*Director of the United States Patent and Trademark Office*